Oct. 27, 1959  H. F. PAYNE  2,910,244
HEAT TRANSFER METHOD AND APPARATUS
Filed Sept. 14, 1956

HUGH FREDERICK PAYNE
By
Campbell, Brumbaugh, Free & Graw
His ATTORNEYS

United States Patent Office

2,910,244
Patented Oct. 27, 1959

2,910,244

HEAT TRANSFER METHOD AND APPARATUS

Hugh Frederick Payne, London, England, assignor to John B. Pierce Foundation, New York, N.Y.

Application September 14, 1956, Serial No. 609,947

Claims priority, application Great Britain September 20, 1955

11 Claims. (Cl. 237—56)

This invention relates to methods of and apparatus for the transfer of heat in manufacturing processes by means of molten substances, especially salts, which are solid at room temperatures. Inorganic salt mixtures, generally eutectics such as a mixture of 40% w./w. sodium nitrite, 7% sodium nitrate and 50% potassium nitrate, offer numerous advantages as heat transfer media, including resistance to hydrolysis, and high thermal conductivity, but their use in circulatory systems has been restricted because of the difficulty of starting up from cold.

The invention consists in a manufacturing process involving the transfer of heat by means of a circulated molten heat transfer medium which is solid at room temperature, in which a volatile solvent for the medium is incorporated therein under a pressure and in an amount sufficient to maintain the liquid phase in the circulatory system on cooling down, and evaporated out, likewise under a pressure sufficient to maintain the liquid phase whilst the medium is subsequently heated up for use.

Suitably, the solvent is pumped, when required as the system is cooling down, from a storage tank therefor into the storage tank for the medium incorporated in the circulatory system. The solvent is fed back in vapour phase from the medium storage tank to the solvent storage tank and is condensed therein as the system is heated up.

If desired, whilst cooling down, a portion of the medium may be fed to an auxiliary tank and allowed to solidify therein, this portion of the medium being subsequently melted, with or without the aid of the solvent, and fed back into the circulatory system when the latter is being heated up. In this way, the storage capacity required for the medium is reduced as it does not all need to be diluted, or diluted to the same extent, with the solvent when allowed to cool to room temperature.

The medium will generally be a water-soluble salt or salt mixture, and the solvent water.

The invention also consists in apparatus for the transfer of heat by means of a circulated heat transfer medium, comprising a circulatory system for the medium including a storage tank therefor, and a storage tank for a volatile solvent for the medium, the two tanks being connected by a vapour line and by a liquid line incorporating a pump for transferring solvent to the medium. The liquid line preferably leads from the lower part of the solvent storage tank to the upper part of the medium storage tank, and in the latter may terminate in a nozzle or nozzles for spraying solvent on to the medium. Generally, the vapour line will include a valve arranged to open only when the vapour pressure reaches a predetermined level, corresponding to that required to maintain the heat transfer medium-solvent mixture liquid in the liquid state, as generally this level will exceed atmospheric at temperatures above the boiling point of the mixture.

The invention further consists in apparatus as set forth in the preceding paragraph, incorporating an auxiliary storage tank for the heat transfer medium connected with the first-mentioned heat transfer medium storage tank by a pipe for the passage of liquid therebetween, with means for melting the contents of the auxiliary storage tank when the circulatory system is heated up. The means may conveniently comprise a vapour line, incorporating a valve, connecting the two heat transfer medium storage tanks. The means may further comprise a second vapour line in the form of a loop connected at both ends to the first-mentioned heat transfer medium storage tank, incorporating a valve if desired, and passing through the auxiliary storage tank and at least an adjacent portion of said pipe, so as to serve as heater.

The solvent storage tank is preferably fitted internally with cooling means, such as a coil for cooling water.

The invention will be described further with reference to the accompanying drawings, of which:

Figure 1:
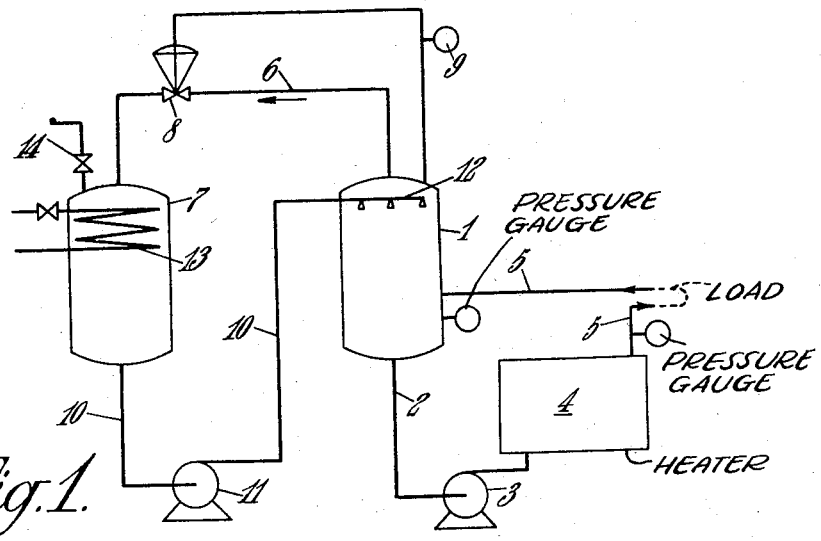
Figure 1 is a diagrammatic representation of one embodiment.

Referring to Figure 1, there is provided a storage tank 1 for heat transfer medium connected by a liquid line 2 to a circulating pump 3 and thence to a heater 4. A loop line 5 leads from heater 4 back to tank 1. Chemical reaction vessels or other equipment (not shown) to be cooled or heated may be fed in parallel with heat transfer medium by tappings (not shown) across loop 5, in conventional manner. A vapour line 6 connects the upper part of tank 1 with the upper part of a tank 7 for the storage of a volatile solvent for the heat transfer medium to be used. Line 6 incorporates a valve 8 constructed to open at a predetermined vapour pressure within tank 1, and connected with a pressure gauge 9. The lower part of tank 7 is connected by liquid line 10 to a pump 11 and thence to a spray ring 12 in the upper part of tank 1. A coil 13 for cooling water is fitted within tank 7, which is provided with a relief valve 14.

In operation, tank 1 is charged with a concentrated aqueous solution of a suitable salt mixture such as that specified above. Pump 3 is started, and heater 4 switched on or lit (as the case may be). As the temperature of the solution reaches its boiling point, the pressure will rise until it reaches about 10 lbs. per square inch in tank 1. When it exceeds this level, valve 8 opens and allows steam to pass into tank 7, in which it is condensed by means of cooling coil 13. As the temperature rises, water is progressively driven off from the circulating medium and condenses in tank 7, until the melting point of the salt mixture is reached. Beyond this point, the circulated medium will be substantially anhydrous.

To shut down the apparatus, cooling water is passed through coil 13 and pump 11 operated at a suitable rate to feed water into tank 1. As this water is sprayed on to the molten medium some is absorbed, and the remainder vapourised so as to pass back to tank 7 along line 6. A pressure of about 10 lbs. per square inch will be maintained automatically in tank 1 until the temperature is below about 100° C., when boiling will no longer occur and all the water in tank 7 can be pumped into the salt solution to maintain it in the liquid phase as it cools further.

The amount of water required will depend on the prevailing ambient temperature. Where this is somewhat above 20° C., a salt mixture concentration of 71 grams per 100 cc. can be maintained, in the case of the salt mixture specified above. The volume of this is nearly three times that of the molten mixture. In an example, where the capacity of the circulatory system (including the bottom portion of tank 1) is 100 litres, it will be necessary to provide a maximum capacity of some 300 litres, corresponding to tank 1 having a capacity of about 200 litres.

Figure 2:
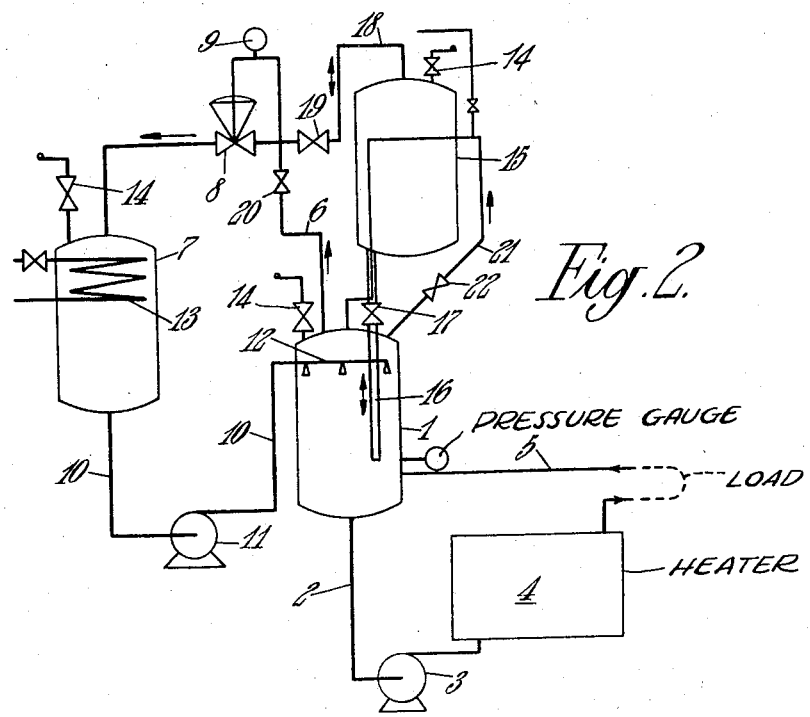
Figure 2 is a diagrammatic representation of a second embodiment.

Figure 2 illustrates a modified system in which a lesser tank storage capacity is required. In this figure, parts corresponding to those of Figure 1 retain the corresponding reference numeral. In addition to tank 1, there is provided an auxiliary medium storage tank 15 the bottom of which is connected with the lower portion of tank 1 by a pipe 16 incorporating a shut-off valve 17. A vapour line 18 leads from tank 15 to line 6 by way of a shut-off valve 19, and line 6 incorporates a shut-off valve 20. A looped vapour line 21 connected at each end to tank 1, passes by way of a shut-off valve 22 into the interior of tank 15, and thence concentrically within pipe 16 for some distance, passing out of the latter to rejoin tank 1. This serves as a heater. The relief valves 14 on tanks 1, 7 and 15 of Figure 2 are similar to the relief valve 14 shown in Figure 1.

In operation, to shut down the apparatus, pump 11 is started to spray water into tank 1 as before. This is continued until the level in tank 1 reaches a predetermined maximum, as indicated by a suitable gauge (not shown). At this stage valve 17 is opened and valve 20 closed, valve 19 being open so that steam pressure in tank 1 will force the somewhat diluted salt mixture through pipe 16 into tank 15. When the latter is sufficiently filled, the level in tank 1 having fallen to a predetermined minimum, the valve 17 is closed and valve 20 opened. Further water is then pumped into tank 1 and steam allowed to escape through line 6 and valve 8 to be condensed in tank 7. As before, this process is continued until all the water in tank 7 has been pumped into tank 1. Valve 22 being closed, the medium in tank 15 will solidify.

On starting up, valves 17 and 19 will be shut, valves 20 and 22 open, and the cooling water in coil 13 will be running. Pump 3 is started, also the heater and, as before, steam from tank 1 will reach and be condensed in tank 7 when the vapour pressure exceeds 10 lbs. per square inch. Concommitantly, steam from tank 1 will pass through valve 22 and condense in line 21 within tank 15, where it will unfreeze a passage within this tank and in the upper part of pipe 16. After the level in tank 1 has fallen to a predetermined minimum, valves 17 and 19 are opened, allowing steam to pass into and condense in tank 15 to liquify the contents, which will pass down through valve 17 into tank 1. Excess steam will be passed to tank 7 where it will be condensed as before. When tank 15 is empty, valve 22 may be closed.

It will be understood that the pressure of 10 lbs. per square inch mentioned above may be varied in the case of different heat transfer media, and that valve 8 may be omitted where this pressure does not exceed atmospheric.

It will be understood also that the solvent may be supplied to the cooling heat transfer medium in vapour form if desired. Thus, steam instead of water could be fed to a cooling down salt mixture, suitably under a constant pressure such as 10 lbs. per square inch. Then, as the mixture cools, the steam will condense and slowly dilute it so as to maintain the liquid phase. If this method is adopted, the storage tank 7 can be dispensed with, since when the system is heated up, the expelled steam can be vented to atmosphere or usefully employed. Such method can be adopted whether or not an auxiliary heat transfer medium storage tank is incorporated. The vapour line, liquid line and pump hereinbefore referred to between the tanks for the solvent and the heat transfer medium will be replaced by a steam connection, preferably incorporating a two-way pressure control valve means.

I claim:

1. Apparatus for the transfer of heat by means of a circulated molten heat transfer medium which is solid at ambient temperature, comprising a circulatory system for the medium including a storage tank therefor, a pump, a heater, and a load, a storage tank for a volatile solvent for the medium, the two tanks being connected by a vapour line for the transfer of evaporated solvent from the medium storage tank to the solvent storage tank and by a liquid line for transferring liquid solvent from the solvent storage tank to the medium storage tank, said liquid line incorporating means for moving the liquid.

2. Apparatus as set forth in claim 1, in which the liquid line leads from the lower part of the solvent storage tank to the upper part of the medium storage tank.

3. Apparatus as set forth in claim 1 in which the vapour line includes a valve, and means responsive to the pressure in said medium storage tank arranged to open only when the vapour pressure reaches a predetermined level, corresponding to that required to maintain the heat transfer medium-solvent mixture liquid in the liquid state.

4. Apparatus as set forth in claim 1, incorporating an auxiliary storage tank for the heat transfer medium connected with the first-mentioned heat transfer medium storage tank by a pipe for the passage of liquid therebetween, with means for supplying heat to said auxiliary storage tank for melting the contents of the auxiliary storage tank when the circulatory system is heated up.

5. Apparatus as set forth in claim 4, in which the means for supplying heat to the contents of the auxiliary storage tank comprise a vapour line, incorporating a valve, connected to the upper portion of said first-mentioned tank and passing into said auxiliary tank.

6. Apparatus as set forth in claim 5, in which said vapour line is in the form of a loop connected at both ends to the upper portion of said first-mentioned heat transfer medium storage tank, incorporates a valve, and passes through the auxiliary storage tank and at least an adjacent portion of said pipe, so as to serve as a heater.

7. Apparatus as set forth in claim 1 in which the solvent storage tank is fitted internally with cooling means.

8. Apparatus for the transfer of heat by means of a circulated molten heat transfer medium which is solid at the ambient temperature, comprising a circulatory system for the medium including a storage tank therefor, a pump, a heater, and a load, and a pipe connecting said tank with a supply of solvent vapour.

9. Apparatus as set forth in claim 8 in which said pipe incorporates a control valve and means responsive to the pressure in said tank to maintain the pressure in said tank at the desired level by flow of solvent vapour.

10. In the process of transferring heat by means of a circulated molten heat transfer medium which is normally solid at ambient temperature, the improvement which comprises pumping a volatile solvent for the medium in the liquid phase to said medium when required as the system is cooling down in an amount and under a pressure sufficient to maintain the medium in the liquid phase on cooling, and heating said solvent-diluted medium at a pressure sufficient to maintain the liquid phase, thereby to remove said solvent from said medium by evaporation and to prepare the medium for re-use, and condensing and storing the vaporized solvent for re-use as the system is heated up.

11. In the process of transferring heat by means of a circulated molten heat transfer medium which is normally solid at ambient temperature, the improvement which comprises incorporating therein a volatile solvent for the medium when the heat transfer process is to be terminated in an amount and under a pressure sufficient to maintain the medium in the liquid phase on cooling, withdrawing a portion of the heat transfer medium while it is cooling down and storing said portion separately and allowing it to solidify, heating said solvent-diluted medium at a pressure sufficient to maintain the liquid phase, thereby to remove said solvent from said medium by evaporation and to prepare the medium for re-use, and melting said portion of said medium by heating and mixing it with the main portion of the heat transfer medium when the latter is being heated.

References Cited in the file of this patent

UNITED STATES PATENTS 1,845,289     Koenemann    ---------- Feb. 16, 1932